Jan. 2, 1945.  DE WITT CLAUSEN  2,366,237
SCOTCH YOKE
Filed Sept. 23, 1943

Inventor
DeWitt Clausen
BY
Parker, Carlson, Pfyme & Hubb
Attorneys

Patented Jan. 2, 1945

2,366,237

UNITED STATES PATENT OFFICE 2,366,237

SCOTCH YOKE

De Witt Clausen, Akron, Ohio, assignor to Lucien I. Yeomans, Inc., Chicago, Ill., a corporation of Illinois Application September 23, 1943, Serial No. 503,503

3 Claims. (Cl. 74—50)

The invention relates to Scotch yokes and has as its general aim the provision of a new and improved device of this character in which power loss due to friction is substantially eliminated and wear is minimized whereby the device has high efficiency and long life.

An object of the invention is to provide a Scotch yoke type of mechanical movement which embodies novel means between the driving and the driven members for minimizing the frictional resistance created by the relative movements of these parts.

More particularly stated, an object of the invention is to provide a device of this nature in which antifriction members interposed between the crank actuated block and the crosshead or yoke are supported in "free floating" relation to the block and to the crosshead for independent movement relative thereto.

Other objects and advantages will become apparent in the following description and from the accompanying drawing, in which.

Figure 1:
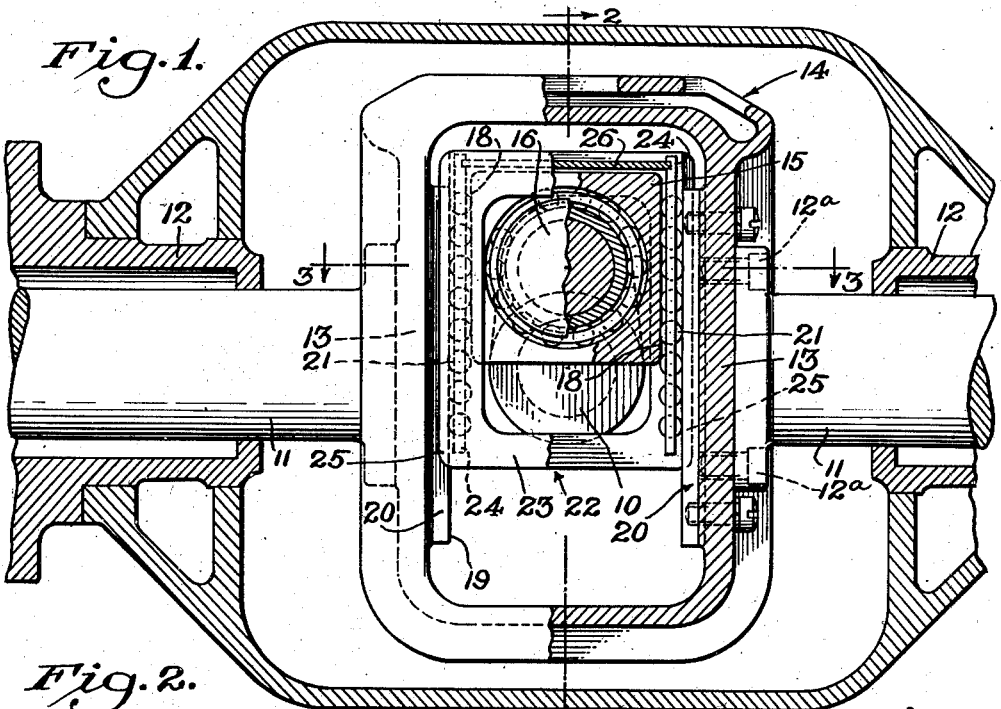
Figure 1 is a side view of a Scotch yoke embodying the features of the invention.
Figure 2:
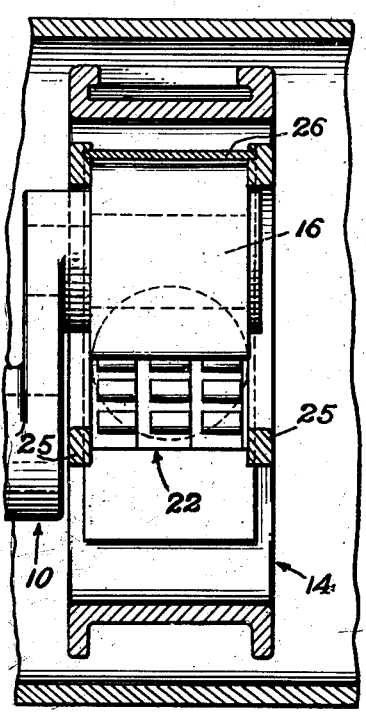
Fig. 2 is a cross sectional view through the device taken substantially along the line 2—2 of Fig. 1.
Figure 3:
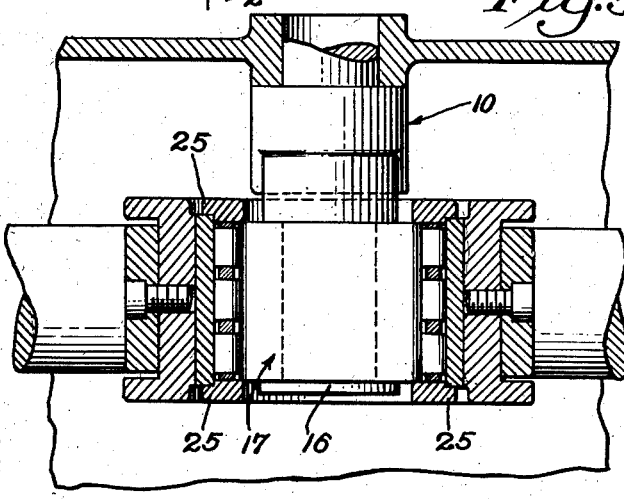
Fig. 3 is a sectional view taken substantially along the line 3—3 of Fig. 1.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

The present invention is shown as being embodied in a Scotch yoke arranged as the driving connection between a power driven crank 10 and the spaced axially alined pistons 11 of an opposed piston type pump. This arrangement is shown merely by way of example, since it will be evident that the present device may be employed in connection with many other mechanisms. In this embodiment, however, the pistons 11 are reciprocally mounted in cylinder blocks 12 and have their inner or adjacent ends rigidly connected as at 12ª centrally with the elongated sides 13 of a slotted crosshead or yoke 14 that extends perpendicularly to the axes of the pistons. A block 15 is suitably supported on an arm or pin 16 of the crank 10, suitable roller bearings 17 preferably being interposed therebetween. As may best be seen in Fig. 1, the block is disposed in the slot of the crosshead and has flattened side faces 18 opposing flat faces 19 on wear plates 20 secured to the crosshead to extend along the sides 13 thereof within the slot.

In the operation of these devices, the circular movement of the crank arm or pin 16 and block 15 thereon will produce a straight line reciprocatory movement of the crosshead 14 and pistons 11, together with a reciprocatory movement of the block 15 relative to the crosshead in a direction perpendicular to the aforesaid straight line reciprocation. The power loss due to friction, and the comparatively heavy wear which introduces undesirable clearance or play between the block and the crosshead, are disadvantages which have been inherent in devices of this character.

The present invention substantially minimizes both of these factors of power loss and wear in a simple and highly efficient manner. To this end the invention contemplates the interpositioning between the block surfaces 18 and 19 on the block and cross head respectively of antifriction elements in the form of a unitary assembly mounted or supported in free floating relation to both the block and crosshead so as to be capable of independent unitary movement. In the present embodiment as shown in Fig. 1 the dimensions of the block between its surfaces 18 is substantially less than the distance between the surfaces 19 on the wear plates 20. In its centered position between the wear plates this dimensional relation provides spaces between the block sides and each of the wear plates to receive bearing elements 21 of an antifriction unit 22.

The antifriction unit 22 is shown herein as embodying centrally open side frames 23 supporting therebetween elongated plate members 24 each of which has a series of pockets formed therein to receive such antifriction elements 21 as the cylindrical rollers herein illustrated. The plates 24 are accurately spaced apart properly to dispose the roller elements between the side faces 18 on the block and the opposed faces 19 on the wear plates. The side frames are so dimensioned that their side edges as indicated at 25 will extend beyond the surfaces 19 on the wear plates to prevent lateral or sidewise displacement of the antifriction unit. The length of each set of antifriction rollers is preferably such as to provide bearing means which is at least coextensive with the length of the block surfaces 18 in any position of the block.

In considering the operation of the device it will be presumed that the crank 10 is rotating clockwise as seen in Fig. 1. One complete revolution of the crank arm 17 will produce one complete reciprocatory stroke of the pistons 11 and one complete reciprocatory stroke of the block 15 with respect to the crosshead. When the axis of the crank arm 16 is alined with the axes of the pistons 11 the pistons will be at one end or the other of a stroke. It is at this point that the thrust load transmitted from the block to the crosshead shifts from the antifriction rollers on one side of the block to those on the other side. At this same instant, however, the block is at the intermediate point of its reciprocatory movement and is traveling at its greatest rate of speed. Consequently the sudden imposition of the thrust force on one or the other of the sets of antifriction rollers occurs when the rollers are traveling at their greatest rate of speed. The rollers are, therefore, able most effectively to take the thrust force imposed thereon. It will be noted, furthermore, that the antifriction elements are under full thrust load at the transition points of their reciprocatory movement as produced by the reciprocation of the block relative to the crosshead and that they approach and leave these transition points gradually and without shock. These relationships materially increase the life, operating and wear resisting characteristics of the present device over prior devices of this character.

In operation the antifriction unit will tend to seek a centered position between the ends of the block and crosshead even though the unit may have settled somewhat by its weight when the device was idle. It is preferred, however, to limit the possible descending movement by such means as a bar 26 extending between the plates 24 across the upper side of the crosshead. The first revolution of the crank will restore the antifriction unit to its centered position.

It will be evident from the foregoing that a Scotch yoke device has been provided which has new and improved means for transmitting the thrust force between the block and the crosshead. Since the free floating antifriction unit is independent of the block and crosshead it is not forced to follow the relative movements of these parts in the same fashion as if it were connected with one or the other. As a result the antifriction unit is free for self-adjustment to its most effective operating position.

I claim as my invention:

1. In a Scotch yoke, the combination of a slotted cross head mounted for reciprocation and having opposed surfaces within the slot extending transversely to the line of reciprocation thereof, a driving block mounted in said slot between surfaces and having movement through a circular path, a frame having side portions rigidly united and disposed adjacent opposite lateral sides of said block, flat supporting members carried by said side portions of said frame and extending one between each opposite side of said block and the adjoining opposed surface on said cross head, and two series of antifriction elements carried by respective ones of said supporting members and located respectively on flat planes between the opposite sides of said block and said cross head, the rigid joining of the side portions of said frame carrying the two series of antifriction elements serving to compel both series to move in unison with each other longitudinally of said slot in the course of movement of said block within said slot.

2. In a Scotch yoke, the combination of a slotted cross head mounted for reciprocation and having opposed surfaces within the slot extending transversely to the line of reciprocation thereof, a driving block mounted in said slot between said surfaces and having movement through a circular path, and unitary antifriction means for transmitting thrust forces from said block to said cross head including a frame, means for locating said frame in free floating relation to said cross head and block in the plane of their relative movements, said frame having lateral side portions rigidly joined together and lying adjacent opposite lateral sides of said block, supporting means carried by said side portions of said frame to extend between said opposite sides of said block and the adjoining opposed surfaces on said cross head, and a series of antifriction elements carried by said supporting means and interposed between said block and cross head, each said series being longer than the surface on said block engaged thereby and shorter than said slot.

3. In a Scotch yoke, the combination of a slotted cross head mounted for reciprocation and having opposed surfaces within the slot extending transversely to the line of reciprocation thereof, a driving block mounted in said slot between said surfaces and having movement through a circular path, and unitary antifriction means for transmitting thrust forces from said block to said cross head including a pair of open center rectangular border frames overlying opposite faces of said block and dimensioned for location of their side portions adjacent opposite lateral edges of the block, supporting means rigidly fixed to said side portions of said frames and extending between the same and located between the opposed side surfaces of said block and slot, and two series of antifriction elements carried by said supporting means at respective opposite sides of said block between the opposed surfaces of the latter and of said slot, each of said series being longer than the surface on said block engaged thereby and shorter than said slot.

DE WITT CLAUSEN.